US011805230B2

(12) United States Patent
Sun

(10) Patent No.: US 11,805,230 B2
(45) Date of Patent: Oct. 31, 2023

(54) SURROUND VIEW MONITORING SYSTEM AND METHOD

(71) Applicant: HYUNDAI MOBIS CO., LTD., Seoul (KR)

(72) Inventor: In Sun Sun, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/361,358

(22) Filed: Jun. 29, 2021

(65) Prior Publication Data
US 2022/0012914 A1 Jan. 13, 2022

(30) Foreign Application Priority Data
Jul. 8, 2020 (KR) .......................... 10-2020-0084366

(51) Int. Cl.
H04N 7/18 (2006.01)
G06K 9/62 (2022.01)
G06T 7/73 (2017.01)
G06T 7/80 (2017.01)
G06F 18/22 (2023.01)
G06V 10/147 (2022.01)
G06V 20/56 (2022.01)

(52) U.S. Cl.
CPC ............ H04N 7/181 (2013.01); G06F 18/22 (2023.01); G06T 7/74 (2017.01); G06T 7/80 (2017.01); G06V 10/147 (2022.01); G06V 20/56 (2022.01); H04N 7/18 (2013.01); G06T 2207/30244 (2013.01); G06T 2207/30252 (2013.01)

(58) Field of Classification Search
CPC ... G06T 7/80; G06T 7/74; G06T 2207/30244; G06T 2207/30252; G06K 9/6201; H04N 7/18
See application file for complete search history.

(56) References Cited

U.S. PATENT DOCUMENTS

2006/0107507 A1* 5/2006 Brose ..................... B25J 9/1684
29/407.05
2008/0170122 A1* 7/2008 Hongo ..................... G06T 7/33
348/148
2016/0140403 A1* 5/2016 Nagata ..................... B60R 1/12
382/104

(Continued)

FOREIGN PATENT DOCUMENTS

JP    2004132870 A  * 10/2002
JP    2004132870 A  *  4/2004
KR    10-0948886        3/2010

OTHER PUBLICATIONS

Saneyoshi K, Translation of JP-2004132870-A,, Apr. 2004 (Year: 2004).*

Primary Examiner — Zaihan Jiang
(74) Attorney, Agent, or Firm — DLA PIPER LLP (US)

(57) ABSTRACT

Disclosed is a surround view monitoring system comprising: a plurality of cameras provided in a vehicle, the cameras being configured to capture first images of surroundings of the vehicle; a non-volatile memory configured to store second images captured by the cameras or position information of the cameras in the vehicle; and a processor configured to match the first images captured by the cameras relative to one another based on the second images or the position information stored in the non-volatile memory.

17 Claims, 5 Drawing Sheets

(56) References Cited

U.S. PATENT DOCUMENTS

| | | | |
|---|---|---|---|
| 2020/0275011 A1* | 8/2020 | Casey | G06T 7/70 |
| 2020/0310442 A1* | 10/2020 | Halder | G05D 1/0212 |
| 2021/0300342 A1* | 9/2021 | Hara | B62D 15/0285 |
| 2021/0319586 A1* | 10/2021 | Rogers | G01B 11/2755 |
| 2021/0380143 A1* | 12/2021 | Alvarez | B60K 35/00 |
| 2022/0061304 A1* | 3/2022 | Bachman | A01M 21/043 |
| 2022/0072957 A1* | 3/2022 | Kunze | G06T 15/20 |
| 2022/0074753 A1* | 3/2022 | Kunze | G02B 27/0101 |
| 2022/0118994 A1* | 4/2022 | Lu | G06T 7/85 |

* cited by examiner

SURROUND VIEW MONITORING SYSTEM AND METHOD

CROSS-REFERENCE TO RELATED APPLICATION

This application claims the benefit of Korean Patent Application No. 10-2020-0084366, filed on Jul. 8, 2020 with the Korean Intellectual Property Office, the disclosure of which is herein incorporated by reference in its entirety.

BACKGROUND OF THE INVENTION

Field of the Invention

The present invention relates to a surround view monitoring system and method, and more particularly to technology for matching images captured by a plurality of cameras into a surround view image.

Description of the Related Art

In recent years, the use of a front camera, a rear camera, and a side view camera in a vehicle has increased. These cameras are frequently used to help a driver and may improve stability of a vehicle.

In particular, a surround view monitoring (SVM) system that displays a 360-degree image of the surroundings of a vehicle in all directions through a plurality of cameras installed at the vehicle has been developed and commercialized.

The SVM system combines images of the surroundings of a vehicle captured by cameras provided at various positions of the vehicle to provide a top view image type surround view image, from which a driver feels as though the driver is viewing the vehicle from above, whereby it is possible to display obstacles around the vehicle and to avoid a blind spot.

In the SVM system, it is essential to correct tolerance of each camera at the time of mounting the cameras. A vehicle equipped with the SVM system is delivered after tolerance is corrected so as to satisfy an image matchability criterion for creating a surround view image.

In the case in which tolerance is accumulated during driving of the vehicle after delivery thereof, however, image matchability is deteriorated. In this case, the driver must visit a service center or a business office while driving the vehicle in order to correct the accumulated tolerance, which is inconvenient.

The matters disclosed in this section are merely for enhancement of understanding of the general background of the invention and should not be taken as an acknowledgment or any form of suggestion that the matters form the related art already known to a person skilled in the art.

SUMMARY OF THE INVENTION

The present invention has been made in view of the above problems, and it is an object of the present invention to provide a surround view monitoring system and method capable of correcting camera tolerance of an SVM system generated and accumulated due to driving of a vehicle.

In accordance with an aspect of the present invention, the above and other objects can be accomplished by the provision of a surround view monitoring system including a plurality of cameras provided in a vehicle, the cameras being configured to capture images of the surroundings of the vehicle, a non-volatile memory configured to store images captured by the cameras or position information of the cameras in the vehicle, and the processor configured to match the images captured by the cameras based on the images or the position information stored in the non-volatile memory.

The plurality of cameras may include a front camera configured to capture an image of the front of the vehicle, a rear camera configured to capture an image of the rear of the vehicle, a left camera configured to capture an image of the left of the vehicle, and a right camera configured to capture an image of the right of the vehicle.

The images stored in the non-volatile memory may be images captured by the cameras in the state in which positions of the cameras are corrected.

The position information stored in the non-volatile memory may be position information about movement or rotation of the cameras in the state in which positions of the cameras are corrected.

The processor may extract features from the stored images and the captured images, may compare the extracted features to estimate current position information of the cameras, and may match the images captured by the cameras based on the estimated current position information.

The processor may extract features from the vehicle included in the stored images and the captured images.

The processor may extract features from the stored images and the captured images and may match the images captured by the cameras based on a relation between the extracted features.

The processor estimate current position information of the cameras based on the captured images, and, in the case in which the estimated current position information of the cameras is within a predetermined allowable range based on the stored position information, may match the images captured by the cameras based on the stored images or the stored position information.

The processor may be configured to determine matchability of a matched image acquired as the result of the processor matching the captured images, wherein, in the case in which the matchability determined by the processor deviates from a predetermined reference, the processor may estimate current position information of the cameras based on the captured images and may match the captured images based on the estimated current position information of the cameras.

The processor may be configured to detect abnormality of the plurality of cameras based on the images captured by the cameras or a signal of the plurality of cameras.

In accordance with another aspect of the present invention, there is provided a surround view monitoring method including storing images captured by cameras or position information of the cameras in a vehicle, capturing images of the surroundings of the vehicle through a plurality of cameras provided in the vehicle, and matching the images captured by the cameras based on the stored images or the stored position information.

The surround view monitoring method may further include correcting positions of the cameras in the state in which the cameras are mounted to the vehicle before the storing step, wherein, in the storing step, position information about movement or rotation of the cameras and the images captured by the cameras in the state in which the positions of the cameras are corrected may be stored.

In the matching step, features may be extracted from the stored images and the captured images, the extracted features may be compared to estimate current position information of the cameras, and the images captured by the cameras may be matched based on the estimated current position information.

In the matching step, features may be extracted from the vehicle included in the stored images and the captured images.

In the matching step, features may be extracted from the stored images and the captured images, and the images captured by the cameras may be matched based on a relation between the extracted features.

In the matching step, current position information of the cameras may be estimated based on the captured images, and, in the case in which the estimated current position information of the cameras is within a predetermined allowable range based on the stored position information, the images captured by the cameras may be matched based on the stored images or the stored position information.

The matching step may include determining matchability of a matched image acquired by matching the captured images, estimating current position information of the cameras based on the captured images in the case in which the determined matchability deviates from a predetermined reference, and matching the captured images based on the estimated current position information of the cameras.

The surround view monitoring method may further include detecting abnormality of the plurality of cameras based on the images captured by the cameras or a signal of the plurality of cameras after the step of capturing the images of the surroundings of the vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
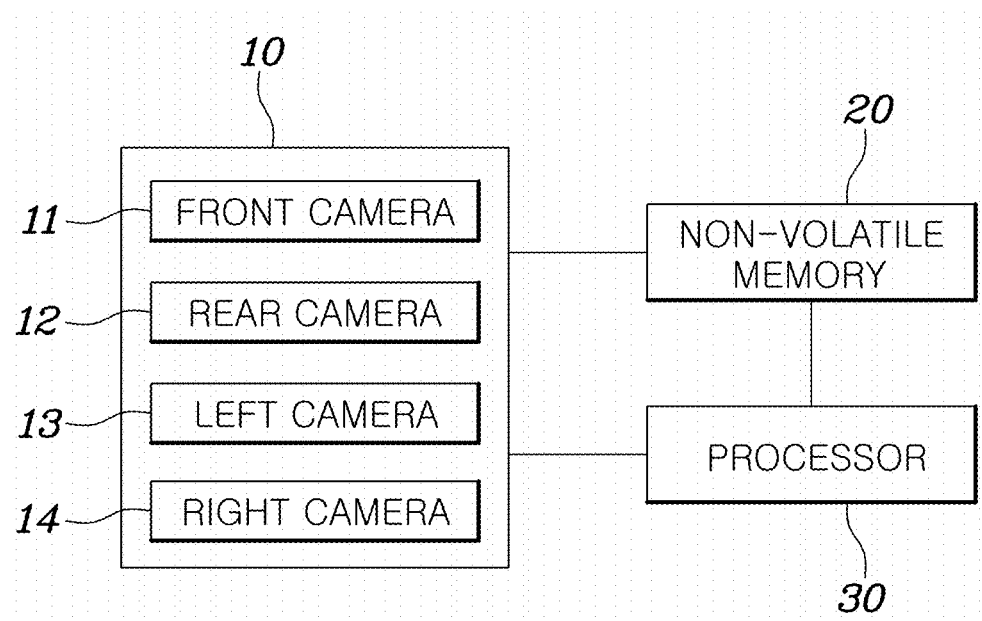
FIG. 1 is a view showing the construction of a surround view monitoring system according to an embodiment of the present invention.

Specific structural or functional descriptions of the embodiments of the present invention disclosed in this specification or this disclosure are given only for illustrating embodiments of the present invention. Embodiments of the present invention may be realized in various forms, and should not be interpreted to be limited to the embodiments of the present invention disclosed in this specification or this disclosure.

Since the embodiments of the present invention may be variously modified and may have various forms, specific embodiments will be shown in the drawings and will be described in detail in this specification or this disclosure. However, the embodiments according to the concept of the present invention are not limited to such specific embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific embodiments, but are not intended to restrict the present invention. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the may relevant art and the present disclosure, and are not to be interpreted in an idealized or overly formal sense unless expressly so defined herein.

Hereinafter, preferred embodiments of the present invention will be described in detail with reference to the accompanying drawings. The same reference numerals presented in the respective drawings denote the same members.

Figure 2:
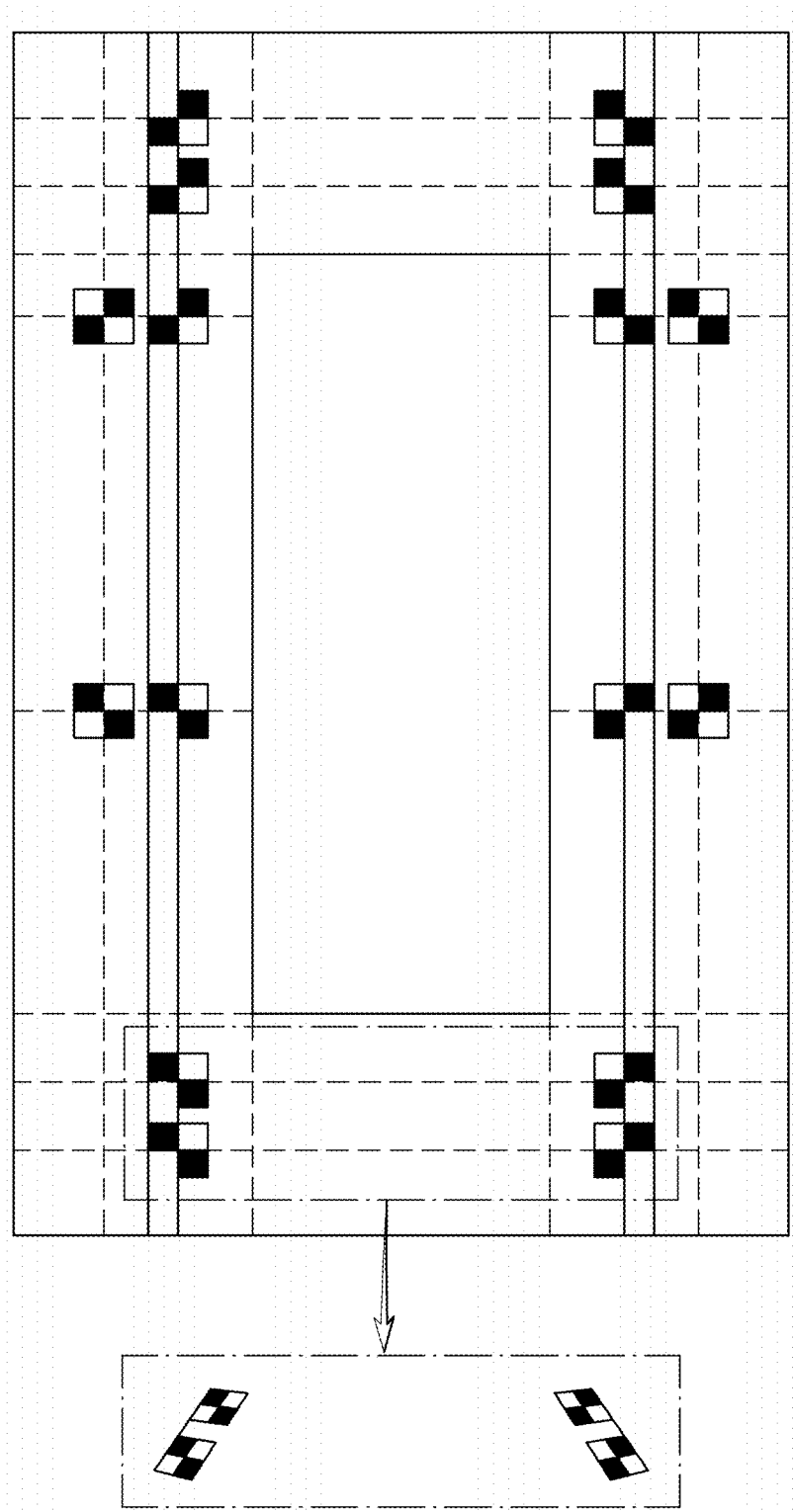
FIG. 2 is a view showing images captured by cameras according to an embodiment of the present invention and stored.

FIG. 1 is a view showing the construction of a surround view monitoring system according to an embodiment of the present invention, and FIG. 2 is a view showing images captured by cameras according to an embodiment of the present invention and stored.

Referring to FIGS. 1 and 2, the surround view monitoring system according to the embodiment of the present invention includes a plurality of cameras 10 including a plurality of cameras 11, 12, 13, and 14 provided in a vehicle, the cameras being configured to capture images of the surroundings of the vehicle, a non-volatile memory 20 configured to store images captured by the cameras or position information of the cameras provided in the vehicle, and the processor 30 configured to match the images captured by the cameras based on the images or the position information stored in the non-volatile memory 20.

The plurality of cameras 10 may include cameras 11, 12, 13, and 14 provided in the vehicle, and the plurality of cameras 11, 12, 13, and 14 may capture images of the surroundings of the vehicle. In particular, the plurality of cameras 11, 12, 13, and 14 may capture images of different regions of the surroundings of the vehicle.

As an embodiment, the non-volatile memory 20 may be a non-volatile memory, and may store images captured by the cameras or may store other images. As an embodiment, the stored position information may be extracted from the stored images.

In particular, as shown in FIG. 2, the stored images may be images of correction plates having lattice patterns provided in a production factory or a matching station in order to correct camera mounting positions based on the images captured by the cameras.

The processor 30 may synthesize images of the surroundings of the vehicle captured by the plurality of cameras 11, 12, 13, and 14 to create a matched image. As an embodiment, the matched image may be a top view type or a bird's-eye view type surround view image.

Particularly, in matching images captured by the cameras to form a surround view image, the processor 30 may use the images or the position information stored in the non-volatile memory 20.

As will be described below, in matching captured images, the processor 30 may use current position information in which the captured images are compared with the stored images or the stored position information.

The non-volatile memory 20 and the processor 30, according to an exemplary embodiment of the present invention may be implemented by an algorithm configured to control the operation of various components of a vehicle, a non-volatile memory (not shown) configured to store data on software commands that reproduce the algorithm, or a processor (not shown) configured to perform the following operation using the data stored in the memory. Here, the memory and the processor may be implemented as individual chips. Alternatively, the memory and the processor may be implemented as an integrated chip. One or more processors may be provided.

Specifically, the plurality of cameras 10 may include a front camera 11 configured to capture an image of the front of the vehicle, a rear camera 12 configured to capture an image of the rear of the vehicle, a left camera 13 configured to capture an image of the left of the vehicle, and a right camera 14 configured to capture an image of the right of the vehicle.

In addition, the plurality of cameras 10 may further include a sensor configured to sense the position of each camera or a manipulator configured to manipulate the position of each camera.

More specifically, the images stored in the non-volatile memory 20 may be images captured by the cameras in the state in which the positions of the cameras are corrected.

In addition, the position information stored in the non-volatile memory 20 may be position information about movement or rotation of the cameras in the state in which the positions of the cameras are corrected.

That is, in the production factory or the matching station of the vehicle, the camera mounting positions may be corrected in order to correct tolerance in the images captured by the cameras provided in the vehicle, and the non-volatile memory 20 may store images captured by the cameras in the state in which the camera mounting positions are corrected as the stored images or may store the positions of the cameras as the stored position information.

Here, the position information of each camera may include a rotation position R of the camera and a movement position T of the camera moved in a straight direction. In particular, rotational directions of the camera may be roll, pitch, and yaw directions of the vehicle.

As an embodiment, the stored position information may be extracted based on the stored images, particularly based on the position of a feature included in the stored images.

Specifically, the stored position information may be extracted by comparing image coordinates of the feature extracted from the stored images captured by the cameras with global coordinates.

As an embodiment, the processor 30 may form top views through homographic conversion of images of the surroundings of the vehicle captured by the plurality of cameras 11, 12, 13, and 14, and may synthesize the top views to create a matched image.

Specifically, a homographic matrix may be extracted from the images of the correction plates having the lattice patterns provided in the production factory or the matching station in order to correct the camera mounting positions.

The homographic matrix may be extracted using a direct linear transform (DLT) algorithm. In particular, since the correction plates having the lattice patterns are placed in the same plane, the homographic matrix may be extracted using image coordinates of four pairs of features extracted from the correction plates and global coordinates.

On the assumption that an intrinsic parameter K of each camera is known, as in the following equation, the stored position information may be extracted from the homographic matrix. In particular, rotation positions r1 and r2 and a movement position t, which are angles rotated about an X axis, a Y axis, and a Z axis based on the ground, among the stored position information, may be extracted from the homographic matrix H.

Figure 3:
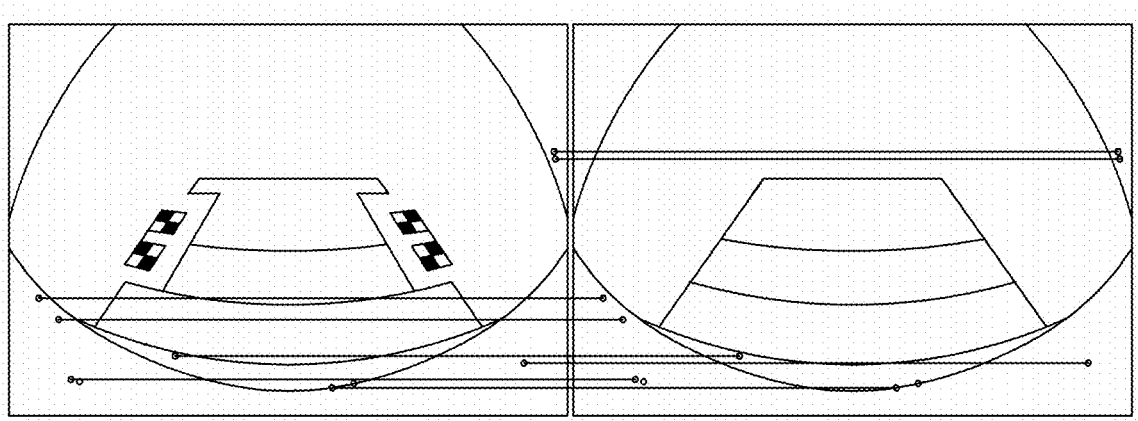
FIG. 3 is a view showing features extracted from stored images and captured images according to an embodiment of the present invention.

FIG. 3 is a view showing features extracted from stored images and captured images according to an embodiment of the present invention.

$$X = (X, Y, 0, 1)$$

$$x = PX$$

$$= K[r_1 r_2 r_3 t] \begin{pmatrix} X \\ Y \\ 0 \\ 1 \end{pmatrix}$$

$$= K[r_1 r_2 t] \begin{pmatrix} X \\ Y \\ 1 \end{pmatrix}$$

$$= H \begin{pmatrix} X \\ Y \\ 1 \end{pmatrix}$$

$$H = \lambda K[r_1 r_2 t]$$

$$K^{-1} H = \lambda [r_1 r_2 t]$$

$$P = K[r_1 r_2 (r_1 \times r_2) t]$$

Referring to FIG. 3, the processor 30 may extract features from the stored images and the captured images, may compare the extracted features to estimate the current position information of the cameras, and may match the images captured by the cameras based on the estimated current position information.

Specifically, the processor 30 may extract features from the stored images, may extract features from the captured images, and match the extracted features.

As an embodiment, the processor 30 may calculate an essential matrix (E) showing the relationship between the captured images and the stored images using matched pairs of features extracted from the captured images and features extracted from the stored images.

In particular, the processor 30 may extract matched pairs having the maximum consensus while removing outliers from a set of matched pairs using random sample consensus (RANSAC) to extract eight matched pairs having highest similarity. The processor 30 may calculate the essential matrix (E) using the extracted eight matched pairs, and may decompose the same to estimate the current position information from the stored position information.

Figure 4A:
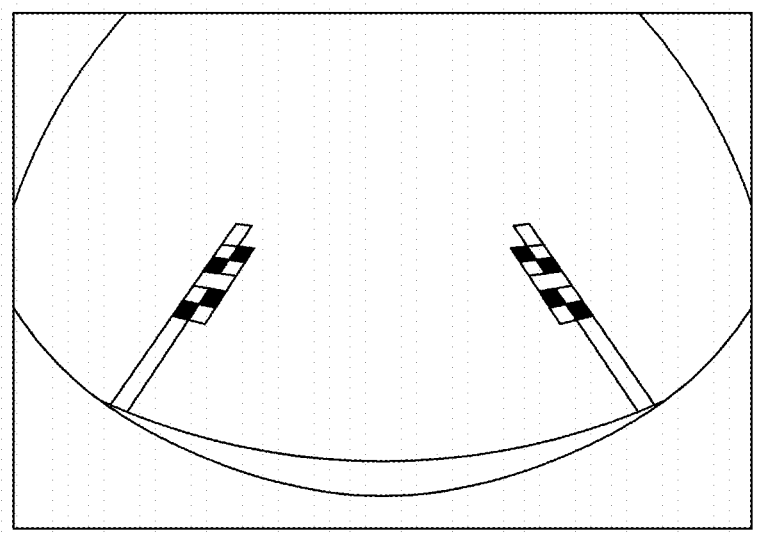
FIGS. 4A and 4B are views showing images captured by cameras according to an embodiment of the present invention.
Figure 4B:
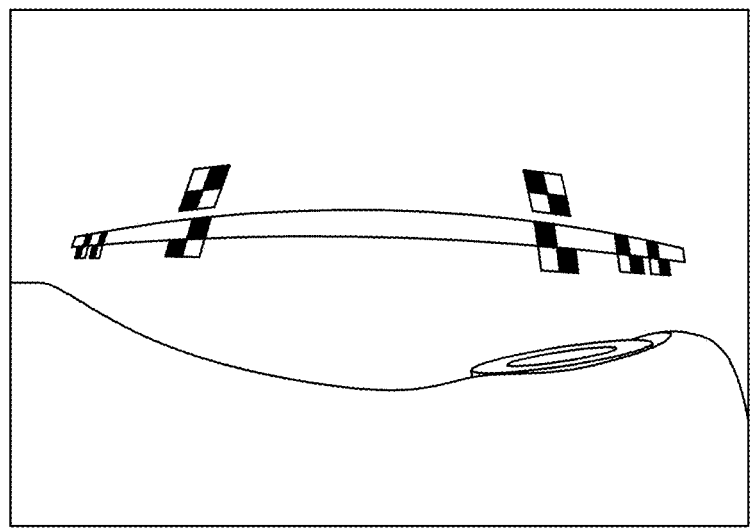

FIGS. 4A and 4B are views showing images captured by cameras according to an embodiment of the present invention.

Referring to FIGS. 4A and 4B, the processor 30 may extract features from a vehicle included in stored images and captured images.

As an embodiment, an image of a bumper and garnish of the vehicle may be captured by the rear camera, and an image of wheels and a side body of the vehicle may be captured by the left camera.

The processor 30 may extract features from the vehicle included in the stored images and the captured images. That is, features may be extracted from images of the body of the vehicle excluding surrounding images changed due to movement of the vehicle, whereby it is possible to select effective features.

The processor 30 may match the images captured by the cameras based on the stored position information, or may match the images captured by the cameras based on the estimated current position information.

Specifically, the processor 30 may estimate the current position information of the cameras based on the captured images, and, in the case in which the estimated current position information of the cameras is within a predetermined allowable range based on the stored position information, may match the images captured by the cameras based on the stored images or the stored position information.

In particular, the processor 30 may extract the current position information R'/T' of the cameras from the captured images, and, in the case in which the current position information R'/T' of the cameras deviates from a predetermined range, as in the following equation, compared to the stored position information R/T, may match images using the current position information R'/T' of the cameras.

$$|'-R|>\alpha \text{ or } |T'-T|>\beta$$

The processor 30 may estimate the current position information R'/T' of the cameras based on the captured images, and, in the case in which the estimated current position information R'/T' of the cameras is within a predetermined allowable range based on the stored position information R/T, may match the images captured by the cameras based on the stored position information R/T.

As an embodiment, the processor 30 may convert the captured images into top views using the extracted homography and may match the top views. As another embodiment, the processor 30 may convert the captured images into top views using the stored position information and may match the top views.

In the case in which the estimated current position information R'/T' of the cameras deviates from the predetermined allowable range based on the stored position information R/T, on the other hand, the processor 30 may extract features from the stored images and the captured images, and may match the images captured by the cameras based on a relation between the extracted features.

As an embodiment, the processor 30 may calculate an essential matrix (E) using the extracted eight matched pairs, and may apply the calculated essential matrix (E) to the captured images to covert the captured images into top views.

As another embodiment, the processor 30 may decompose the essential matrix to estimate the current position information R'/T', compared to the stored position information R/T, and may convert the captured images into top views using the estimated current position information RTF.

Figure 5:
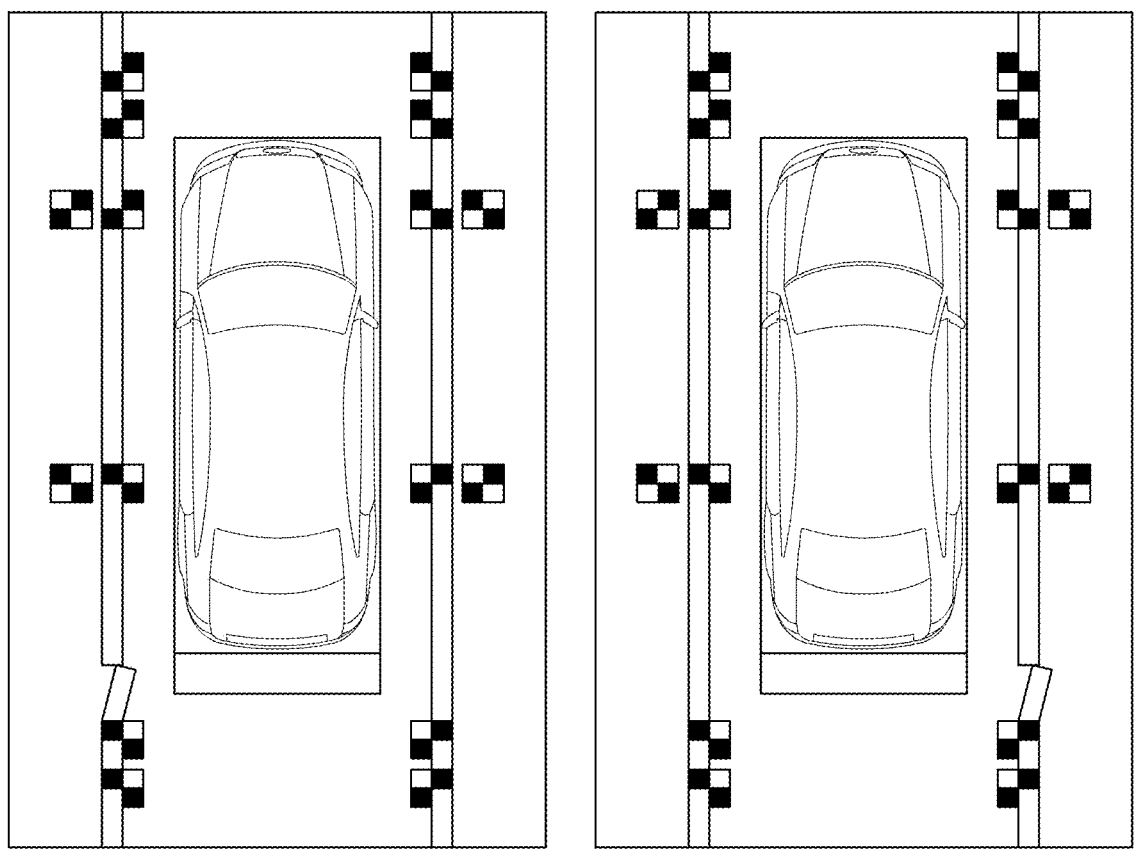
FIG. 5 is a view showing a matched image according to an embodiment of the present invention.

FIG. 5 is a view showing a matched image according to an embodiment of the present invention.

Referring to FIG. 5, a processor 30 configured to determine matchability of a matched image acquired as the result of the processor 30 matching the captured images may be further included. In the case in which the matchability determined by the processor 30 deviates from a predetermined reference, the processor 30 may estimate the current position information of the cameras based on the captured images, and may match the captured images based on the estimated current position information of the cameras.

The processor 30 may determine matchability of a matched image acquired as the result of the processor 30 matching the captured images. In particular, the matched image may be an image captured by each camera based on the stored position information R/T.

As an embodiment, as shown in FIG. 5, the processor 30 may determine matchability by sensing whether the matched image is distorted. That is, the processor 30 may determine matchability using a change in inclination between continuous straight lines in the matched image.

As another embodiment, the processor 30 may perform numerical calculation using at least one of angle deviation of lanes recognized in top view images and the total difference in pixel values of a blending region in which individual top view images overlap each other in order to create a surround view image.

As a first technique, on the assumption that the average angle of lanes extracted from individual top view images, such as VF (front), VR (right), VL (left), and VB (rear), is $\mu_a$, a distortion detection unit may calculate a distortion estimation value G of each of individual top view images through the following equation.

$$|G = \sum_{a \in V} \left| \frac{\pi}{2} - \mu_a \right|$$

Here, $V=\{V_F, V_R, V_L, V_B\}$ and $\mu_a$ is the average lane angle (radian) of image $\alpha$, which is one of individual top view images.

The sum of deviations between the lane angles recognized in top view images and 90 degrees ($\pi/2$) is calculated through the above equation. At this time, lanes determined to have a confidence of a pre-designated critical value or more may be selected as objects to be calculated.

In the case in which several lanes dispersed in various directions are present in individual top view images, therefore, only lanes having similar directions to the current advancing direction of the vehicle based on a predetermined criterion may be selected, whereby the average lane angle in individual top view images may be calculated, and the distortion estimation value G of each of individual top view images may be calculated using the same.

As a second technique, the processor 30 may calculate the degree of distortion of each of individual top view images through the following equation that calculates a total difference D in pixel values of a blending region in which individual top view images overlap each other in order to create a surround view image. Here, the pixel values may be, for example, brightness values of pixels.

$$D = \lambda_1 \sum_{\beta \in B} |p_\beta - q_\beta| + \lambda_2 \sum_{\delta \in B} |p_\delta - q_\delta|$$

Here, $\lambda_1$ and $\lambda_2$, which are weight factors, may be set such that the sum of $\lambda_1$ and $\lambda_2$ satisfies 1. B may be a coordinate range of the blending region, $\beta$ may be a position in the coordinate range of the blending region, $p_\beta$ may be a pixel value of position $\beta$ in the blending region of a first individual top view image forming the blending region, and $q_\beta$ may be a pixel value of position $\beta$ in the blending region of a second individual top view image forming the blending region.

In addition, $\delta$ may be a position at which a surrounding object having a height equal to or greater than a pre-designated critical value (e.g. a pedestrian or an adjacent vehicle), among surrounding objects recognized in the coordinate range of the blending region, comes into contact into the ground, $p_\delta$ may be a pixel value of position $\delta$ in the blending region of a first individual top view image forming the blending region, and $q_\delta$ may be a pixel value of position $\delta$ in the blending region of a second individual top view image forming the blending region.

The weight factor $\lambda_1$ is a weight factor applied to the sum of pixel value differences between pixels belonging to the blending region, and the weight factor $\lambda_2$ is a weight factor applied to the sum of pixel value differences between pixels at a position at which a surrounding object having a height equal to or greater than a critical value comes into contact into the ground, among pixels belonging to the blending region.

As the weight factor $\lambda_2$ is set to a relatively large value within a range of 0, which is the minimum value, to 1, which is the maximum value, therefore, an object having a height (e.g. a pedestrian or a vehicle), among recognized surrounding objects, is more seriously considered, whereby the degree of distortion of individual top view images may be calculated. When considering that position information of a surrounding object may be used as a reference position when creating a surround view image, as previously described, setting the magnitude of the weight factor $\lambda_2$ may be specifically meaningful. Of course, one of $\lambda_1$ and $\lambda_2$ may be set to 0 (zero), as needed.

Although each of $\lambda_1$ and $\lambda_2$ may be set to, for example, 0.5, each of $\lambda_1$ and $\lambda_2$ may be set to an experimentally and statistically optimum value through repeated tests. After test result data are accumulated, each of $\lambda_1$ and $\lambda_2$ may be selected as an optimum value adaptable to a surrounding environment using a pre-designated optimization algorithm.

As an embodiment, in the case in which a plurality of straight lines, such as a parking lot, is sensed in the captured images, the processor 30 may determine matchability of the matched image.

The processor 30 may determine whether matchability of the matched image acquired by matching the captured images deviates from a predetermined reference based on the stored position information determined by the processor 30, and, in the case in which the matchability deviates from the predetermined reference, may match the captured images based on the estimated current position information of the cameras.

Here, the predetermined reference may be a reference at which the level of reliability of the determined matchability is numerically calculated.

The processor 30 configured to detect abnormality of the plurality of cameras 10 based on the images captured by the cameras or a signal of the plurality of cameras 10 may be further included.

The processor 30 may detect whether hidden portions are present in images captured by the cameras included in the plurality of cameras 10, whether foreign matter or pollutants are present in the captured images, or whether the sensors included in the plurality of cameras 10 generate abnormal signals.

Upon detecting that abnormality is present in the images captured by the cameras or signals from the plurality of cameras 10, the processor 30 may generate an abnormality detection signal. When the abnormality detection signal is generated, the processor 30 may transmit the abnormality detection signal to a cluster or a controller.

In addition, when the abnormality detection signal is generated, the processor 30 may interrupt matching of the captured images.

Figure 6:
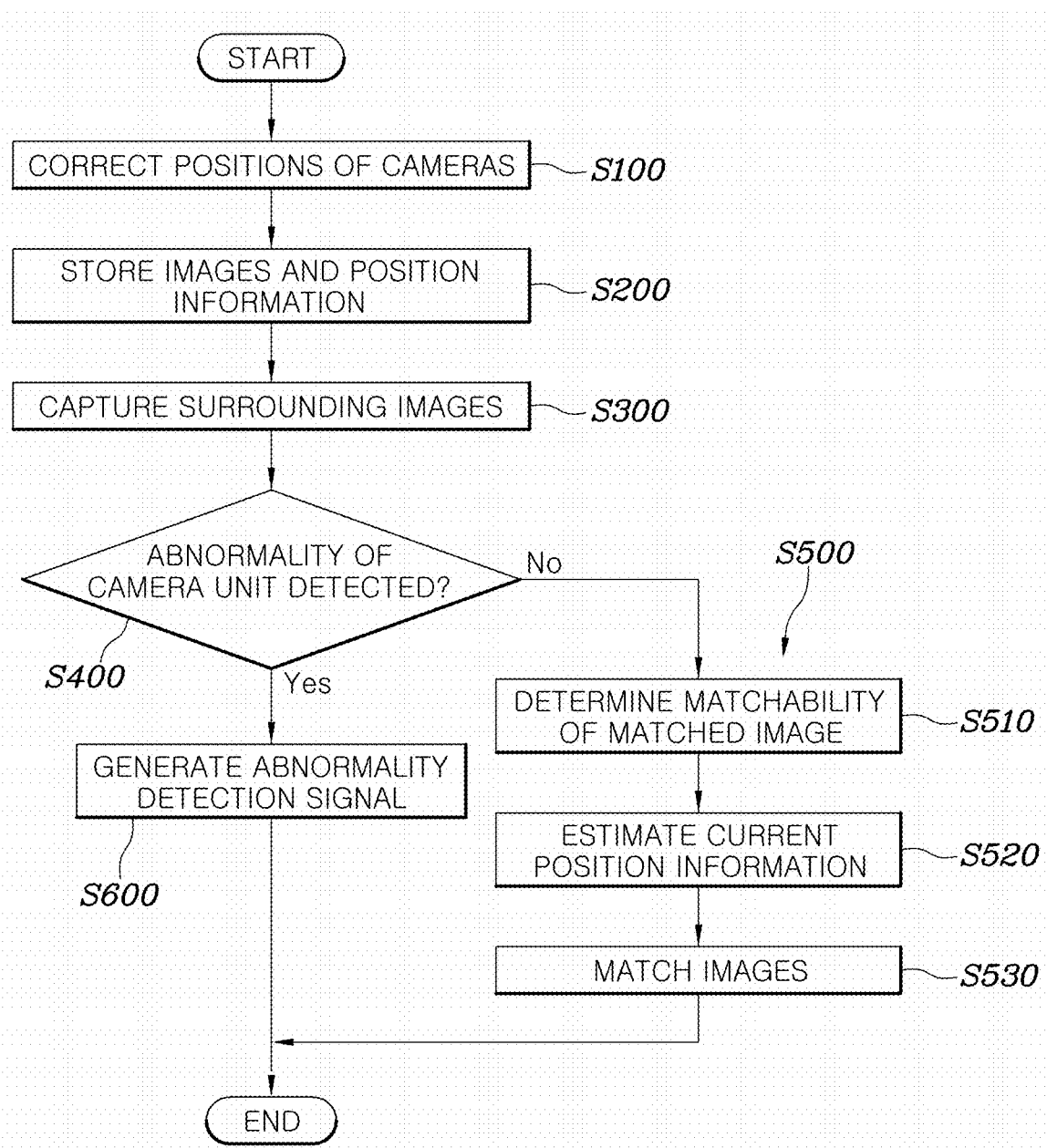
FIG. 6 is a flowchart showing a surround view monitoring method according to an embodiment of the present invention.

FIG. 6 is a flowchart showing a surround view monitoring method according to an embodiment of the present invention.

Referring to FIG. 6, the surround view monitoring method includes a step (S200) of storing images captured by cameras or position information of the cameras in a vehicle, a step (S300) of capturing images of the surroundings of the vehicle through a plurality of cameras 11, 12, 13, and 14 provided in the vehicle, and a step (S500) of matching the images captured by the cameras based on the stored images or the stored position information.

A step (100) of correcting the positions of the cameras in the state in which the cameras are mounted to the vehicle before the storing step (S200) may be further included. In the storing step (S200), position information about movement or rotation of the cameras and the images captured by the cameras in the state in which the positions of the cameras are corrected may be stored.

In the matching step (S500), features may be extracted from the stored images and the captured images, the extracted features may be compared to estimate current position information of the cameras, and the images captured by the cameras may be matched based on the estimated current position information.

In the matching step (S500), features may be extracted from a vehicle body of the vehicle included in the stored images and the captured images.

In the matching step (S500), features may be extracted from the stored images and the captured images, and the images captured by the cameras may be matched based on a relation between the extracted features.

In the matching step (S500), the current position information of the cameras may be estimated based on the captured images, and, in the case in which the estimated current position information of the cameras is within a predetermined allowable range based on the stored position information, the images captured by the cameras may be matched based on the stored images or the stored position information.

The matching step (S500) may include a step (S510) of determining matchability of a matched image acquired by matching the captured images, a step (S520) of, in the case in which the determined matchability deviates from a predetermined reference, estimating the current position information of the cameras based on the captured images, and a step (S530) of matching the captured images based on the estimated current position information of the cameras.

A step (S400) of detecting abnormality of the plurality of cameras 10 based on the images captured by the cameras or a signal of the plurality of cameras 10 after the step of capturing the images of the surroundings of the vehicle may be further included.

In the case in which abnormality of the plurality of cameras 10 is detected in the step (S400) of detecting abnormality of the plurality of cameras 10, an abnormality detection signal may be generated (S600). When the abnormality detection signal is generated, image matching may not be performed.

In the case in which abnormality of the plurality of cameras 10 is not detected, on the other hand, the images captured by the cameras may be matched (S500).

As is apparent from the above description, a surround view monitoring system and method according to the present invention have an effect in that, in the case in which tolerance is generated in cameras provided in a vehicle, it is possible to correct the tolerance using initial position information of the cameras.

In addition, the surround view monitoring system and method according to the present invention have an effect in that matchability of a surround view image of the vehicle is improved and labor for periodic tolerance correction is reduced.

Although the preferred embodiments of the present invention have been described above with reference to the accompanying drawings, those skilled in the art will appreciate that the present invention can be implemented in various other embodiments without changing the technical ideas or features thereof.

What is claimed is:

1. A surround view monitoring system comprising:
a plurality of cameras provided in a vehicle, the cameras being configured to capture first images of surroundings of the vehicle;
a non-volatile memory configured to store second images captured by the cameras or position information of the cameras in the vehicle, wherein the second images stored in the non-volatile memory are images captured by the cameras in a state in which positions of the cameras are corrected; and
a processor configured to match the first images captured by the cameras relative to one another based on the second images or the position information stored in the non-volatile memory, wherein the processor is further configured to: sense whether the first images are distorted, calculate a distortion value associated with the first images based on an angle deviation of selected lanes in the first images from a reference angle, wherein the selected lanes have directions that align with a traveling direction of the vehicle, and determine a matchability between the first images and the second images based on the distortion value.

2. The surround view monitoring system according to claim 1, wherein the plurality of cameras comprise:
a front camera configured to capture an image of a front of the vehicle;
a rear camera configured to capture an image of a rear of the vehicle;
a left camera configured to capture an image of a left of the vehicle; and
a right camera configured to capture an image of a right of the vehicle.

3. The surround view monitoring system according to claim 1, wherein the position information stored in the non-volatile memory is position information about movement or rotation of the cameras in a state in which positions of the cameras are corrected.

4. The surround view monitoring system according to claim 1, wherein the processor is configured to extract features from the second images and the first images, compare the extracted features to estimate current position information of the cameras, and match the first images captured by the cameras based on the estimated current position information.

5. The surround view monitoring system according to claim 4, wherein the processor is configured to extract features from the vehicle included in the second images and the first images.

6. The surround view monitoring system according to claim 4, wherein processor is configured to extract features from the stored images and the captured images and match the first images captured by the cameras based on a relation between the extracted features.

7. The surround view monitoring system according to claim 1, wherein the processor is configured to extract current position information of the cameras based on the first images, and, in a case in which the estimated current position information of the cameras is within a predetermined allowable range based on the stored position information, match the first images captured by the cameras based on the second images or the stored position information.

8. The surround view monitoring system according to claim 1, wherein the processor is configured to determine matchability of a matched image acquired as a result of the matching of the captured images, and, in a case in which the determined matchability deviates from a predetermined reference, estimate current position information of the cameras based on the first images and match the first images based on the estimated current position information of the cameras.

9. The surround view monitoring system according to claim 1, wherein the processor is configured to detect abnormality of the plurality of cameras based on the first images captured by the cameras or a signal of the plurality of cameras.

10. A surround view monitoring method comprising:
storing second images captured by the cameras or position information of the cameras in a vehicle; and
capturing first images of surroundings of the vehicle through a plurality of cameras provided in the vehicle;
sensing whether the first images are distorted;
calculating a distortion value associated with the first images based on an angle deviation of selected lanes in the first images from a reference angle, wherein the selected lanes have directions that align with a traveling direction of the vehicle;
matching the first images captured by the cameras relative to one another based on the second images and the distortion value associated with the first images, or the stored position information.

11. The surround view monitoring method according to claim 10, further comprising:
  correcting positions of the cameras in a state in which the cameras are mounted to the vehicle before the storing, wherein the storing comprises storing position information about movement or rotation of the cameras and the second images captured by the cameras in a state in which the positions of the cameras are corrected.

12. The surround view monitoring method according to claim 10, wherein the matching comprises extracting features from the second images and the first images, comparing the extracted features to estimate current position information of the cameras, and matching the first images captured by the cameras based on the estimated current position information.

13. The surround view monitoring method according to claim 12, wherein, the matching comprises extracting features from the vehicle included in the second images and the first images.

14. The surround view monitoring method according to claim 12, wherein, the matching comprises extracting features from the second images and the first images, and matching the first images captured by the cameras based on a relation between the extracted features.

15. The surround view monitoring method according to claim 10, wherein, the matching comprises estimating current position information of the cameras based on the first images, and, in a case in which the estimated current position information of the cameras is within a predetermined allowable range based on the stored position information, matching the first images captured by the cameras based on the stored images or the stored position information.

16. The surround view monitoring method according to claim 10, wherein the matching comprises:
  determining matchability of a matched image acquired by matching the first images;
  in a case in which the determined matchability deviates from a predetermined reference, estimating current position information of the cameras based on the first images; and
  matching the first images based on the estimated current position information of the cameras.

17. The surround view monitoring method according to claim 10, further comprising detecting abnormality of the plurality of cameras based on the first images captured by the cameras or a signal of the plurality of cameras after the capturing of the first images of the surroundings of the vehicle.

\* \* \* \* \*